United States Patent [19]

Nomura et al.

[11] Patent Number: 4,792,979
[45] Date of Patent: Dec. 20, 1988

[54] METHOD OF AND APPARATUS FOR CORRECTING GRADATION OF IMAGE REPRESENTED BY IMAGE DATA

[75] Inventors: Akihiro Nomura, Osaka; Yasuo Kurusu, Kyoto, both of Japan

[73] Assignee: Dainippon Screen Mfg. Co., Ltd., Kyoto, Japan

[21] Appl. No.: 82,334

[22] Filed: Aug. 6, 1987

[30] Foreign Application Priority Data

Aug. 8, 1986 [JP] Japan .................................. 61-187379

[51] Int. Cl.$^4$ .............................................. G06K 9/36
[52] U.S. Cl. .......................................... 382/54; 382/1; 358/283
[58] Field of Search ........................ 382/1, 18, 51, 54; 358/282, 283; 356/408; 364/525, 526

[56] References Cited

U.S. PATENT DOCUMENTS

| 4,450,482 | 5/1984 | Ackerman | 358/166 |
| 4,472,736 | 9/1984 | Ushio et al. | 382/18 |
| 4,667,228 | 5/1987 | Kawamura | 358/80 |
| 4,679,095 | 7/1987 | Kitamura et al. | 358/282 |
| 4,727,434 | 2/1988 | Kawamura | 358/280 |

FOREIGN PATENT DOCUMENTS 60-105375  6/1985  Japan .

OTHER PUBLICATIONS

H. Archer, "Automatic Analysis of Reproduction Copy for Optimum Tone Reproduction", 1985 *Proceedings of Technical Association of the Graphic Arts* (1985): 546,555.

Primary Examiner—Leo H. Boudreau
Assistant Examiner—Donald J. Daley
Attorney, Agent, or Firm—Lowe, Price, LeBlanc, Becker & Shup

[57] ABSTRACT

A standard gradation correction curve independent of characteristics of an original image is prepared in advance. An accumulated density historgram curve of the original is obtained from image data of the original. A first gradation correction curve is obtained by modifying the standard gradation correction curve, while a second gradation correction curve is obtained by modifying the accumulated density histogram curve. A third gradation correction curve is obtained by linear combination of the first and second gradation conversion curves to perform gradation correction of the image data on the basis of the third gradation correction curve.

10 Claims, 10 Drawing Sheets

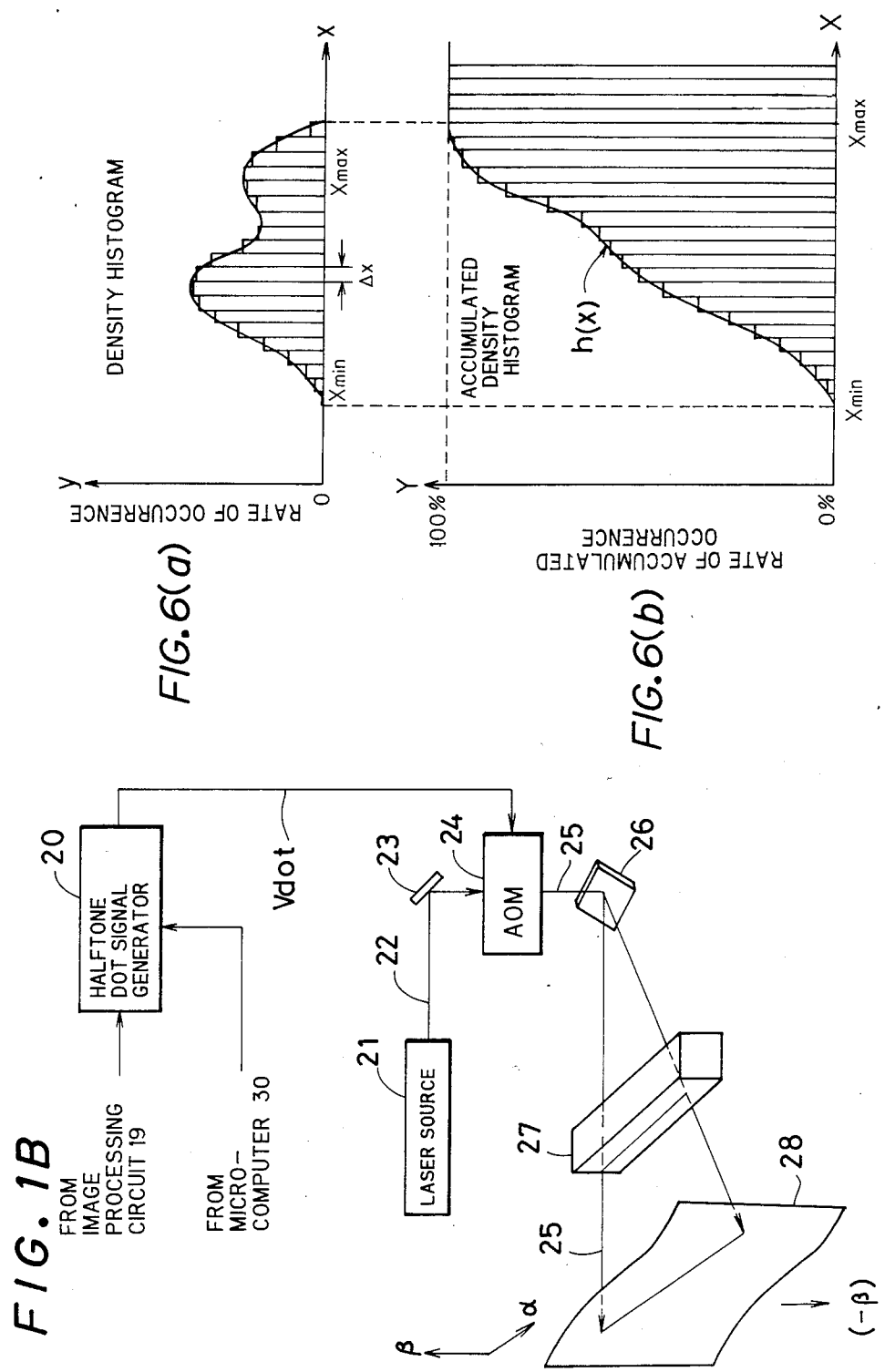

TO MICROCOMPUTER 30 THROUGH I/O PORT 33

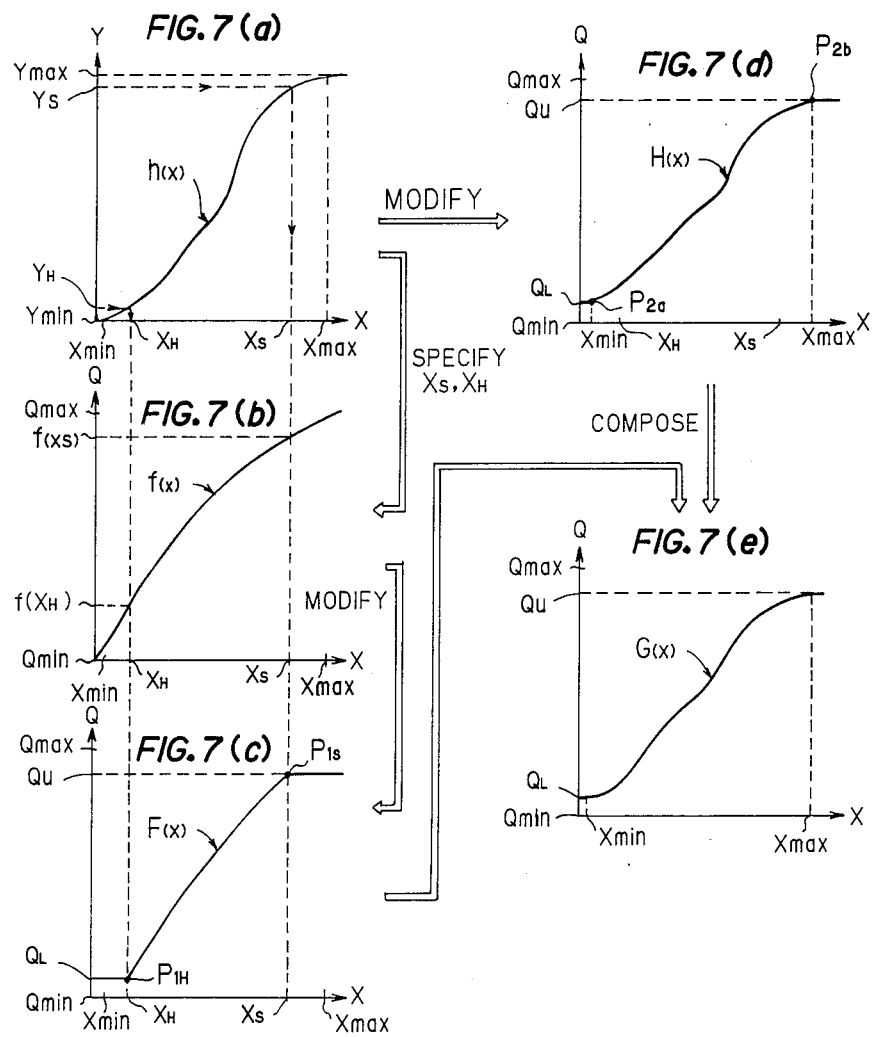

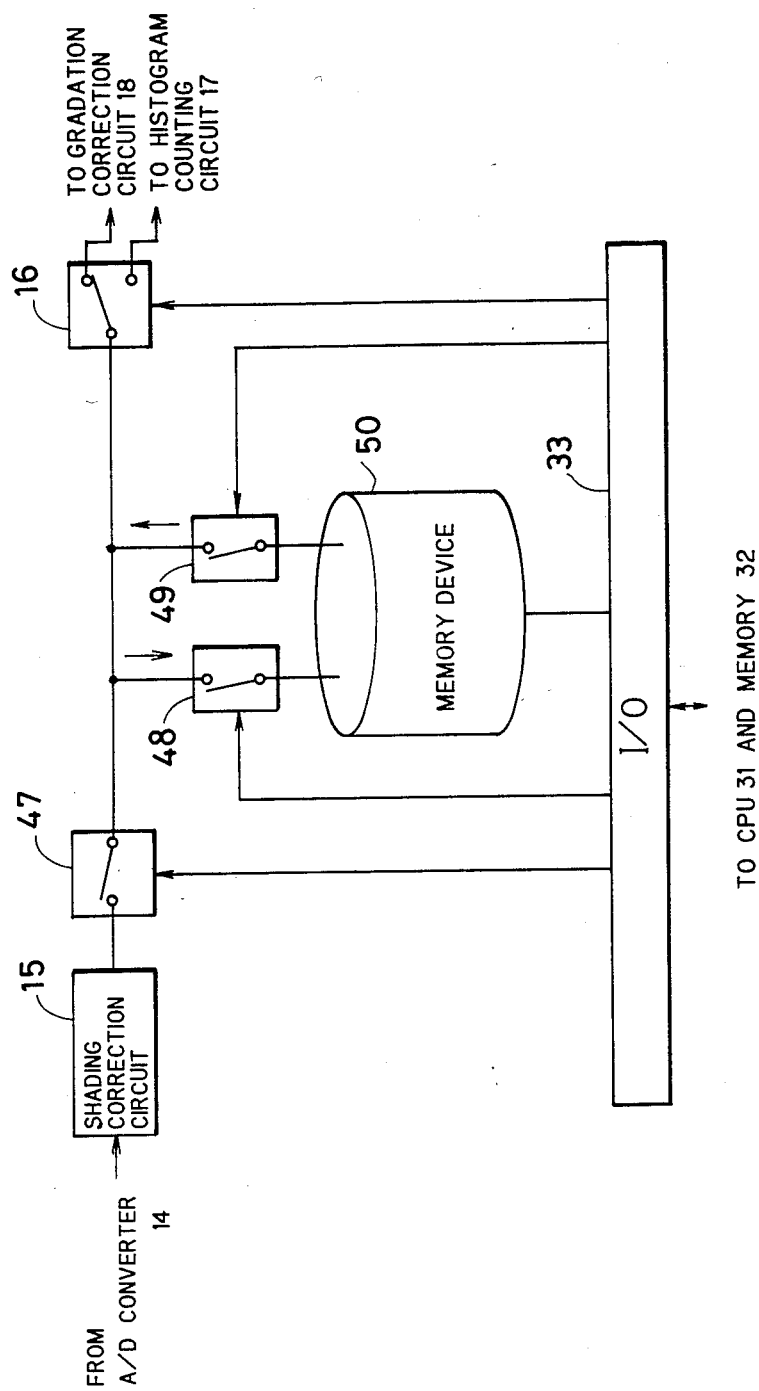

METHOD OF AND APPARATUS FOR CORRECTING GRADATION OF IMAGE REPRESENTED BY IMAGE DATA

BACKGROUND OF THE INVENTION

1. Field of the Invention

The present invention relates to a method of and an apparatus for correcting the gradation of an image represented by image data.

2. Description of the Prior Art

In a conventional image processing apparatus such as a process scanner, gradation correction is performed on image obtained by reading an original with a photoelectric converter thereby to obtain a recorded image having desired gradation expression. In order to perform such gradation correction, it is preferable not to use a fixed gradation correction table, but to employ a gradation conversion table responsive to the characteristics of the original image to be processed. However, the image processing apparatus adapted to generate an apropriate gradation correction table responsive to the characteristics of the original image is complicated in structure.

Therefore, efforts have been made to develop a technique involving a simple structure for obtaining a gradation correction table which is responsive to the characteristics of each original. For example, a method for determining a gradation correction curve on the basis of a density histogram of an image has been proposed. This method is based on a technical concept of assigning a large number of gradation levels to a density range in which a number of pixels are concentrated in order to provide clear discrimination of fine differences in density to such a density range.

In this method, density histograms of images are first classified into a plurality of types by reading various standard pieces of printed matter. The types of the density histograms are represented by modeled density histogram patterns (standard histogram patterns) respectively, and a gradation correction curve is prepared for each standard histogram pattern in response to the characteristic of that pattern.

Then, a density histogram is obtained with respect to an original to be actually read. This density histogram is visually compared with the respective standard histogram patterns by an operator. The standard histogram pattern, which is most similar in configuration to the density histogram of the original to be read, is selected to perfom gradation correction on the basis of the gradation correction curve corresponding to the standard histogram patterns thus selected.

In this method, however, a number of standard histogram patterns must be obtained in advance in order to provide the most appropriate gradation correction curve for each original. As a result, the work required by the operator for determining the configuration and the number of the standard histogram patterns are substantial, and this increases costs. Further, memory capacity required for such jobs is also increased.

In another conventional technique, gradation correction curves themselves are modeled to prepare a plurality of types of standard gradation correction curves. When the standard gradation correction curves are modified so that density values designated "highlight" and "shadow points" are corrected to prescribed output values, respectively. Thereafter some density values are additionally selected as check points. With respect to the check points thus set, deviations between the standard gradation correction curves and desired correction characteristics are automatically calculated through an arithmetic unit. Then, a standard gradation correction curve having the minimum sum of deviations with respect to the respective check points are selected and employed for an actual gradation correction.

The second technique requires no processing of the operator's visual observation of the density distribution of the original. However, as in the aforementioned first method, this technique is also inconvenient since a number of the standard gradation correction curves must be prepared, and required memory capacity is also increased as the number of types is increased. Further, when the numbers of check points and standard gradation correction curves are increased in order to more appropriately select the standard gradation correction curve with respect to the original to be read, the operating time for arithmetic is increased, thereby delaying the processing.

SUMMARY OF THE INVENTION

According to the present invention, a method for correcting the gradation of an image comprises the steps of: preparing a standard gradation correction curve expressing an arbitrarily defined correction rule; receiving an image obtained by reading an image of an original with a photoelectric scanning mechanism; statistically obtaining a density distribution curve of the image on the basis of the image data; obtaining a first gradation correction curve on the basis of the standard gradation correction curve; obtaining a second gradation correction curve on the basis of the density distribution curve of the image; composing the first and second gradation correction curves at an arbitrary ratio to obtain a third gradation correction curve; and correcting the gradation of the image data through the third gradation correction curve to obtain a gradation corrected image.

In a preferred embodiment of the present invention, the density distribution curve is expressed by an accumulated density histogram curve. The standard gradation correction curve is linearly transformed to pass through a first group of coordinated points arbitrarily provided on a gradation correction coordinate plane, to provide the first gradation correction curve. The accumulated density histogram curve is linearly transformed to pass through a second group of coordinate points arbitrarily provided on the gradation correction coordinate plane to provide the second gradation correction curve. The first and second groups of coordinate points may be set in response to upper and lower limits of a desired gradation correction density range. Linear combination of the first and second gradation correction curves is caluculated, thereby to obtain the third gradation correction curve.

The present invention is also directed to an apparatus for correcting the gradation of an image represented by image data, and the apparatus comprises: memory means for storing standard gradation correction data expressing a previously prepared standard gradation correction curve; counting means for counting the frequency of occurrences of density levels in image data to obtain statistical data statistically expressing the density distribution of the image; first gradation correction curve generating means for generating a first gradation correction curve on the basis of the standard gradation correction data; second gradation correction curve generating means for generating a second gradation correction curve on the basis of the statistical data; composing means for composing the first and second gradation correction curves at an arbitrary ratio to provide a third gradation correction curve; and gradation correcting means for correcting the gradation of the image on the basis of the third gradation correction curve to generate a gradation corrected image.

According to the present invention, a natural reproduced record image is secured by general gradation correction characteristics of the standard gradation correction curve. Further, the individual characteristics of the original can be incorporated in the gradation corrected image data since the density distribution of the original image is also taken into account in the conversion process.

In this invention, the term "density38 is used to indicate not only an optical density level, but also to indicate general amounts responsive to optical density levels such as Munsell values, output signal levels of an original reading apparatus and halftone area rates in halftone image recording.

Accordingly, an object of the present invention is to provide a converting method and an apparatus, which can properly correct the gradation of an image in response to characteristics of the image without a complicated procedure.

Another object of the present invention is to reduce the processing time for creating gradation correction curves and memory capacity required for a gradation correcting process.

These and other objects, features, aspects and advantages of the present invention will become more apparent from the following detailed description of the present invention when taken in conjunction with the accompany drawings.

BRIEF DESCRIPTION OF THE DRAWINGS

FIGS. 1A and 1B are schematic block diagrams showing an embodiment of the present invention which is used for gradation correction processing in a process scanner;

FIGS. 6A and 6B are a diagram showing a relation between a density histogram and an accumulated density histogram;

FIGS. 7A–7E are a diagram showing a modification had a composition of gradation correction curves;

FIG. 11 is a block diagram showing another embodiment of the present invention.

DESCRIPTION OF THE PREFERRED EMBODIMENTS

Figure 1A:
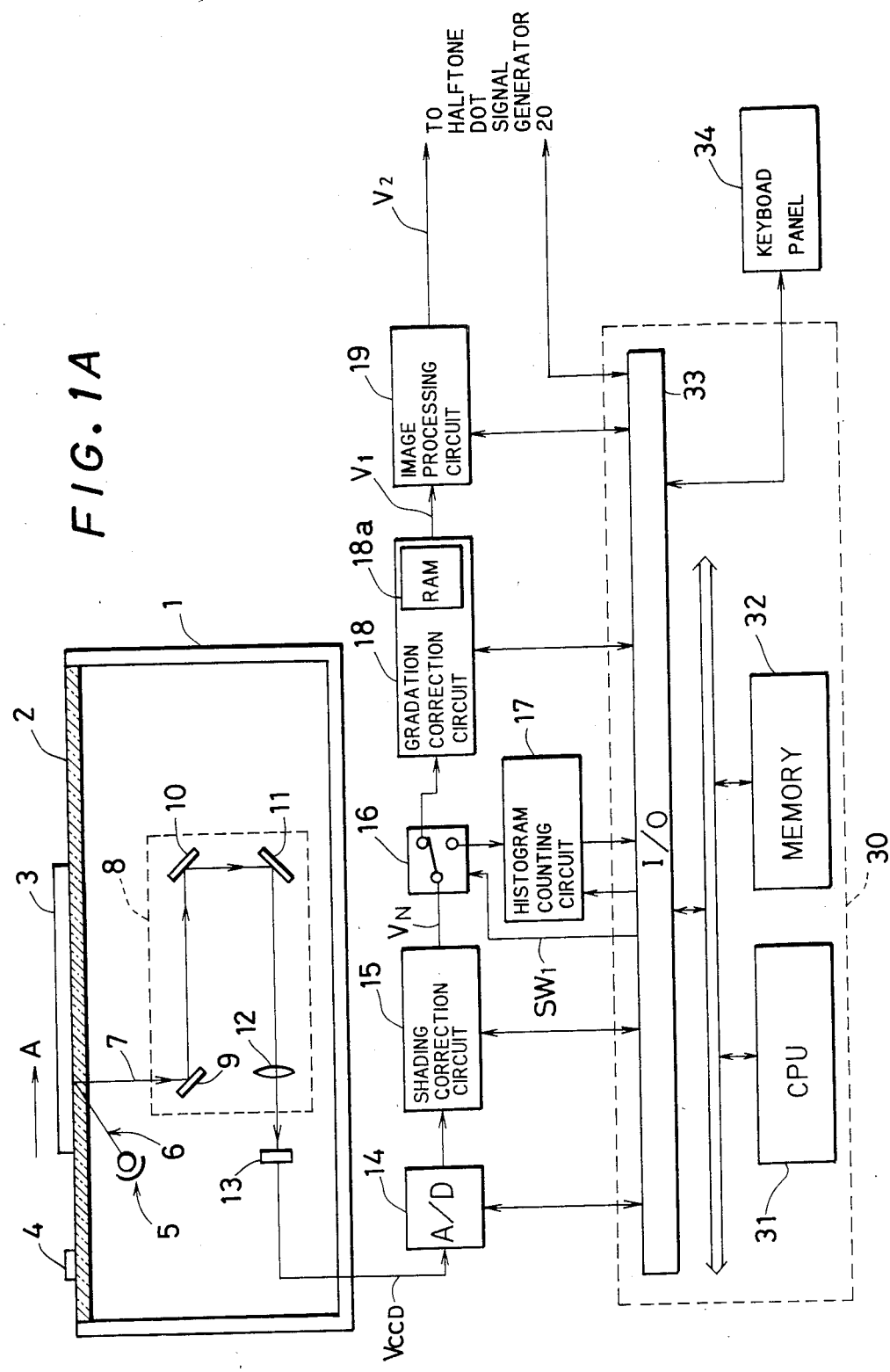

FIGS. 1A and 1B show a process scanner in which a gradation correcting apparatus according to an embodiment of the present invention is provided. The process scanner has a transparent original receiving glass plate 2 which is provided in an upper opening of a frame box 1. An original 3 is placed on the original receiving glass plate 2 in a downwardly directed state. A white reference plate 4 for shading correction is provided on an end surface of the original receiving glass plate 2. Light 6 emitted from a light source 5 formed by a halogen lamp or the like is reflected by the image surface of the original 3, to provide light 7 including image data of the original 3. The reflected light 7 is sequentially reflected by first to third mirrors 9-11 included in an optical system 8, to form an image on a light receiving plane of a CCD line sensor 13 as a photoelectric converter through an image forming lens 12. The CCD line sensor 13 is formed by CCD elements one-dimensionally arranged in a direction perpendicular to the plane of the drawing. Thus, the direction perpendicular to the plane of FIG. 1A is the main scanning direction.

On the other hand, the light forming the image on the light receiving plane of the CCD line sensor 13 is photoelectrically converted by the CCD line sensor 13 to provide an image signal $V_{CCD}$ for each pixel. The image signal $V_{CCD}$ representing the image of the original 3 is digitalized by an A-D converter 14 in each pixel. A digital image signal thus obtained is supplied to a shading correction circuit 15 in a time-series manner. This shading correction circuit 15 is adapted to correct nonuniformity in illumination on the surface of the original 3, nonuniformity in image forming function of the image-forming optical system 8 and nonuniformity in photosensitivity of each CCD element forming the CCD line sensor 13. An image signal $V_N$ obtained through shading correction is selectively supplied to either a histogram counting circuit 17 or a gradation correction circuit 18 including a look-up table RAM 18a through a switching circuit 16.

The histogram counting circuit 17 is adapted to obtain an accumulated density histogram as statistical data (density distribution curve) statistically expressing an optical density distribution in the image of the original 3. A gradation correction table is determined on the basis of the result of counting by the histogram counting circuit 17, as hereinafter described. The gradation correction table is stored in the RAM 18a of the gradation correction circuit 18.

An image signal $V_1$ subjected to gradation correction in the gradation correction circuit 18 is supplied to an image processing circuit 19 of a subsequent stage, to be subjected to processing such as unsharp masking (sharpness enhancement processing), magnification change and the like. An image signal $V_2$ thus obtained is outputted to a halftone dot signal generator 20 as shown in FIG. 1B. A halftone dot signal $V_{dot}$ from the halftone dot generator 20 serves a modulation control signal for an acoustic-optical modulator 24.

The acoustic-optical modulator 24 is supplied with laser beam 22 from a laser source 21 through a mirror 23. This acoustic-optical modulator 24 modulates the laser beam 22 on the basis of the halftone dot signal $V_{dot}$ to provide an exposure beam 25. The exposure beam 25 is horizontally oscillated by vibration of a galvano mirror 26 to be irradiated on the surface of a recording photosensitive material 28 through an image forming optical system 27 formed by an fθ lens and the like. The galvano mirror 26 vibrates in synchronization with precise timing provided by the CCD elements in the CCD line sensor 13, thereby to achieve optical scanning in the main scanning direction α.

The light source 5 and the first mirror 9 are fixed to a moving mechanism (not shown) for relatively translating the same in a direction A as shown in FIG. 1A with respect to the original 3, whereby the original 3 is optically scanned in the direction A by illumination light 6. The photosensitive material 28 is withdrawn in a downward direction $(-\beta)$ in FIG. 1A synchronously with the aforementioned movement of the light source 5 and mirror 9, thereby to achieve reading subscanning in the direction A and recording subscanning in the direction $\beta$. Namely, the image of the original 3 is read with a photoelectric scanning mechanism formed by the light source 5, the optical system 8, the CCD line sensor 13, the moving mechanism and the like.

On the other hand, the process scanner is provided with a microcomputer 30 for controlling the aforementioned circuits and performing data processing (particularly that for creating a gradation correction table as hereinafter described). The microcomputer 30 has a CPU 31 and a memory 32, and is connected to the shading correction circuit 15, the switching circuit 16, the histogram counting circuit 17, the gradation correction circuit 18, the image processing circuit 19 and the halftone dot signal generator 20 through an I/O port 33. A keyboard panel 34 for inputting various data as hereinafter described is also connected to the I/O port 33.

Figure 2:
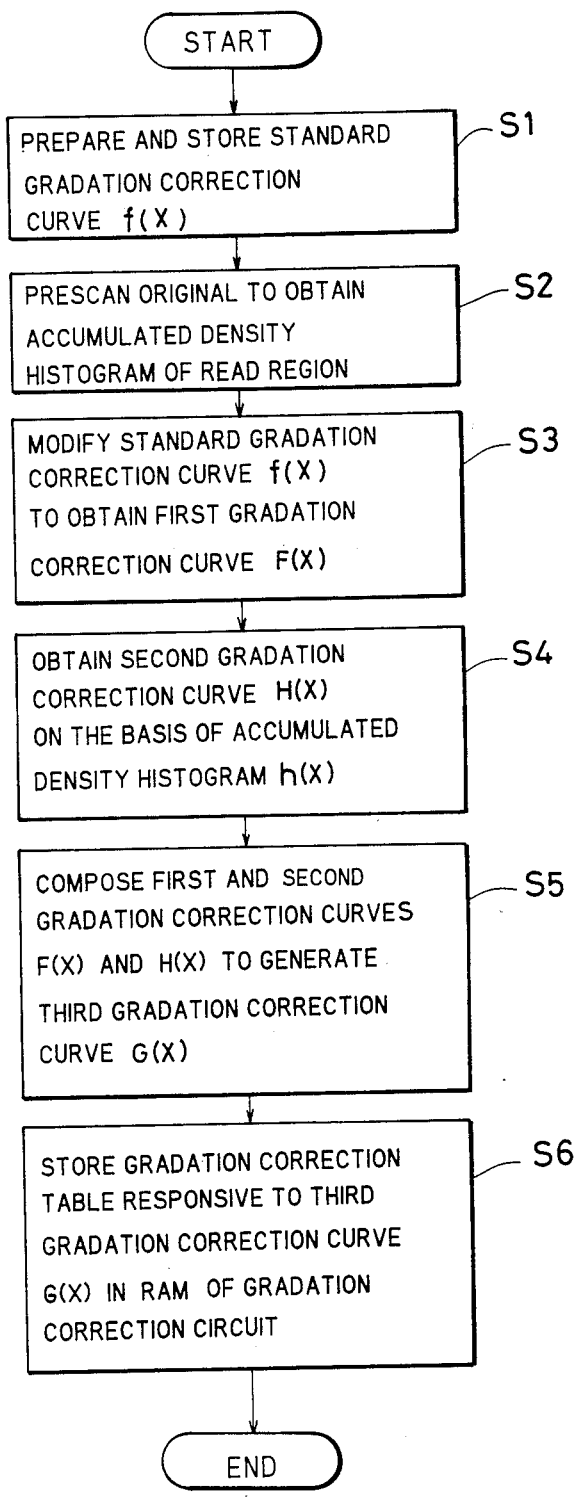
FIG. 2 is a flow chart showing the order of creating a gradation correction table in the embodiment of FIGS. 1A and 1B.

Description is now made in detail on operation for creating a gradation correction table in this embodiment. FIG. 2 is a flow chart showing this operation, and the following description is made along the order as shown in FIG. 2.

At a step S1 of FIG. 2, a standard gradation correction curve f(X) expressing an arbitrarily defined gradation correction rule is arbitrarily prepared. It is preferred that the shape of the standard gradation correction curve f(X) be determined on the basis of many experiences so that images of various originals are corrected to provide natural reproduced images through the standard gradation correction curve f(X). A functional form or numerical data expressing the standard gradation correction curve f(X) is stored in the memory 32. Symbol X indicates a density variable. In this embodiment, the standard gradation correction curve f(X) is formed by an experientially known standard gradation correction curve which is generally recognized to be a proper curve for gradation correction. In contrast to the conventional case, it is not necessary to prepare a number of such standard gradation correction curves, but only a single gradation correction curve is prepared in this embodiment.

Further, the density variable X of the standard gradation correction curve f(X) and a density level f(X) after gradation correction may be in the form of optical density values themselves, or in the form of amounts responsive to the optical density values such as a Munsell value, a pixel density read signal level $V_N$ after shading correction and a halftone area rate. According to this embodiment, the density variable X is made to correspond to the level of the pixel density signal $V_N$ after shading correction and the density value f(X) after gradation correction is made to correspond to the halftone area rate. FIG. 7(b) illustrates an example of the standard gradation correction curve f(X), where the symbol Q indicates the halftone area rate.

At a subsequent step S2, the original 3 is prescanned to obtain an accumuated density histogram of the image data of the original 3. This process is performed as follows:

First, the switching circuit 16 is switched to connect the histogram counting circuit 17 by a switching signal $SW_1$ from the microcomputer 30. Thereafter optical scanning is performed on the read region of the original 3, so that the CCD line sensor 13 outputs an image read signal $V_{CCD}$ for each pixel in a time-series manner. This image read signal $V_{CCD}$ is A-D converted by the A-D converter 14. The digital image signal thus obtained is supplied to the shading correction circuit 15, to be subjected to shading correction. This shading correction is performed on the basis of reference density data obtained by reading the white reference plate 4. The image signal $V_N$ obtained by such shading correction is supplied to the histogram counting circuit 17 through the switching circuit 16.

Figure 3:
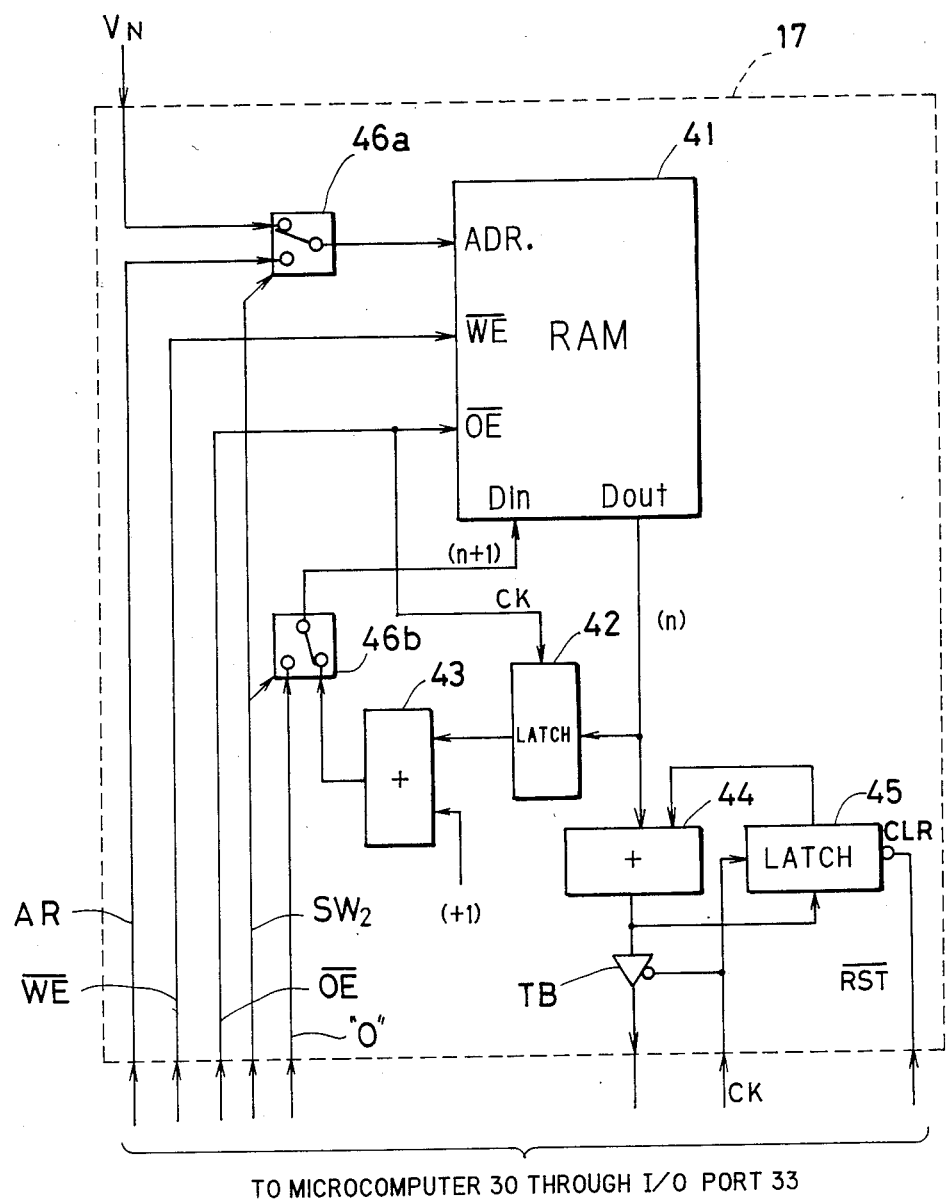
FIG. 3 is a block diagram showing structure of a histogram counting circuit in the emodiment.

FIG. 3 shows an exemplary structure of the histogram counting circuit 17. This histogram counting circuit 17 is provided with a RAM 41. When a switching circuit 46a is switched to the image signal $V_N$ side by a switching signal $SW_2$ from the microcomputer 30, the image signal $V_N$ (=density X) can be employed as an address signal for the RAM 41. In the address corresponding to each density level X, the frequency of occurrences of a pixel having the density level X is stored in the RAM 41 as a data value W, through operation as hereinafter described. Data output $D_{out}$ from the RAM 41 is supplied to an adder 43 through a latch circuit 42. This adder 43 is adapted to add (+1) to an inputted signal and supply the result of addition as data input $D_{in}$ for the RAM 41.

In an initial state, switching circuits 46a and 46b are switched to the I/O port 33 side by the switching signal $SW_2$, so that an address signal AR, a write signal $\overline{WE}$, an output enable signal $\overline{OE}$ and data "0" from the microcomputer 30 are inputted in the RAM 41, so that the data "0" is written in the RAM 41.

Then, the selectors 46a and 46b are respectively switched to the sides of the image signal $V_N$ and the adder 43 by the switching signal $SW_2$. Therefore, in scanning as hereinafter described, the relation ship among connections is such that the image signal $V_N$ serves as an address input for the RAM 41 and the output of the adder 43 serves as a data input $D_{in}$. Further, the write enable signal $\overline{WE}$ and the output enable signal $\overline{OE}$ are supplied at timing as hereinafter described. The output enable signal $\overline{OE}$ also serves as a clock signal CK for latching in the latch circuit 42.

When the image signal $V_N$ from the shading correction circuit 15 of FIG. 1A is supplied to the RAM 41 in this state, an address corresponding to the density level x indicated by the image signal $V_N$ within the storage areas of the RAM 41 is accessed. When the output enable signal $\overline{OE}$ of this RAM 41 is changed to an active level "L" as shown in FIG. 4(b), the data W is read from the address corresponding to the image signal $V_N$.

The value n of the data W thus read is supplied to the adder 43 through the latch circuit 42. Then, the adder 43 outputs a data value (n+1) obtained by adding (+1) to the data value n.

Figure 4:
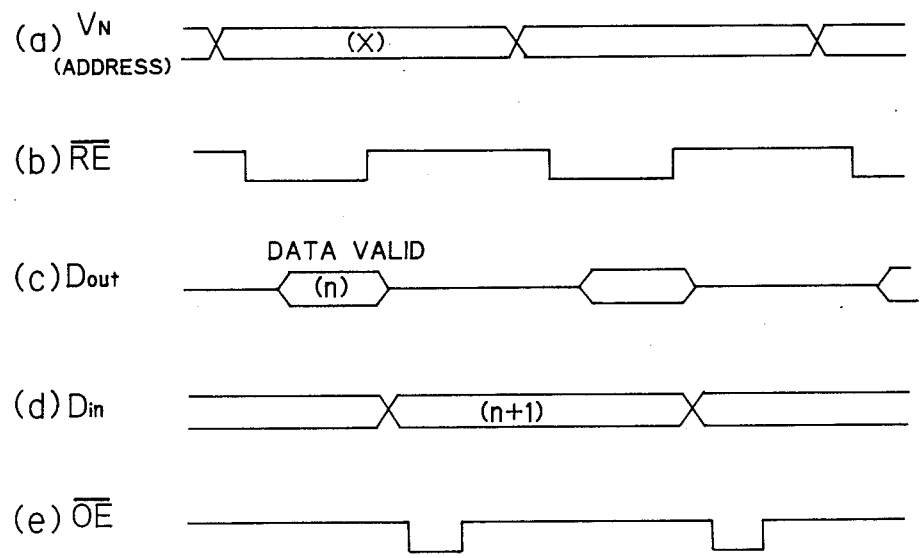
FIG. 4 is a timing chart showing operation of the histogram counting circuit.

In this state, the write enable signal $\overline{WE}$ for the RAM 41 becomes an active level "L" as shown in FIG. 4(e). Then, the data value (n+1) outputted from the adder 43 is substituted in the address corresponding to the density level X within the storage areas of the RAM 41, to be stored in the same.

Figure 5A:
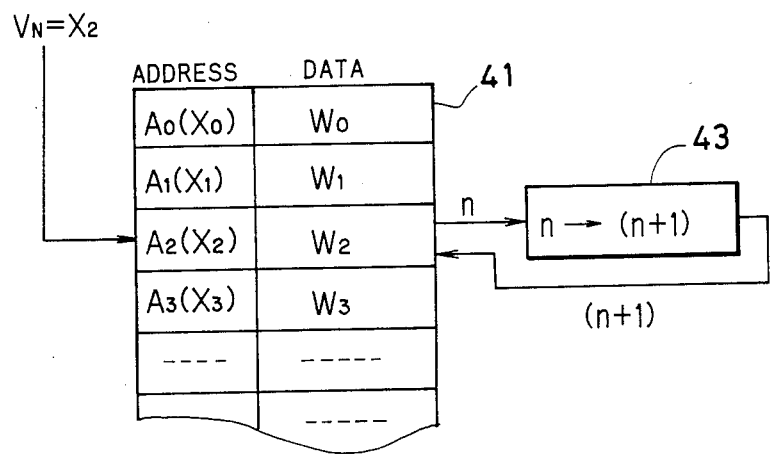
FIGS. 5A and 5B are diagrams showing the counting principle of the histogram counting circuit.

FIG. 5A conceptually shows this operation, while it is assumed that the image signal $V_N$ has a value corresponding to a density level $X_2$ in FIG. 5A. Within the storage areas of the RAM 41, an address $A_2$ corresponding to the density level $X_2$ is accessed so that data $W_2$ (having data value n) stored in the address $A_2$ is read out. The value (n+1) obtained by adding (+1) to the value n is substituted for old data n stored in the address $A_2$, to be stored in the same as a new value $W_2$.

Such an operation is repeated so that data $W_0$, $W_1$, $W_2$, . . . indicating the frequency of occurrences of pixels having density levels $X_0$, $X_1$, . . . corresponding to the addresses are stored on addresses $A_0$, $A_1$, . . . of RAM 41 respectively, as shown FIG. 5A. Therefore, the combination of the RAM 41 and the adder 43 of FIG. 3 serves as a circuit for counting the frequency to give the density histogram. Upon completion of prescanning of the original 3, a density histogram shown in FIG. 6(a) is obtained. However, the vertical axis of FIG. 6(a) represents by no means the number of pixels itself, but the same represents the rate y of occurrences of pixels with respect to respective density levels. This rate y of occurrences is obtained by dividing the respective count values by the number of whole pixels. Density width $\Delta X$ indicates density quantization width for obtaining the density histogram. Therefore, when the image signal $V_N$ is of M bits, $2^M$ storage areas are secured in the RAM 41 so that the density width X is responsive to resolution of the image signal $V_N$. In this case, the counting operation is done for each density region having the density width $\Delta X$.

The counting operation can also be achieved by preparing a large number of counters correspondent to the density levels. In this case, however, an extremely large number of counters ($2^M$ counters in the aforementioned example) are required in order to precisely obtain the density histogram. When the aforementioned circuit having the RAM 41 is employed, a precise density histogram can be obtained to relatively simple structure.

Description is now made of an operation for obtaining the accumulated density histogram. Although such operation can be performed in the microcomputer 30, this embodiment employs an adder 44 and a latch circuit 45 for obtaining the accmulated density histogram. In this operaion, the switching circuits 46a and 46b are switched to the microcomputer 30 side by the switching signal $SW_2$. The output enable signal $\overline{OE}$ for the RAM 41 is activated and the microcomputer 30 supplies address signals sequentially incremented from $A_0$ of FIG. 5B as address input to the RAM 41.

Figure 5B:
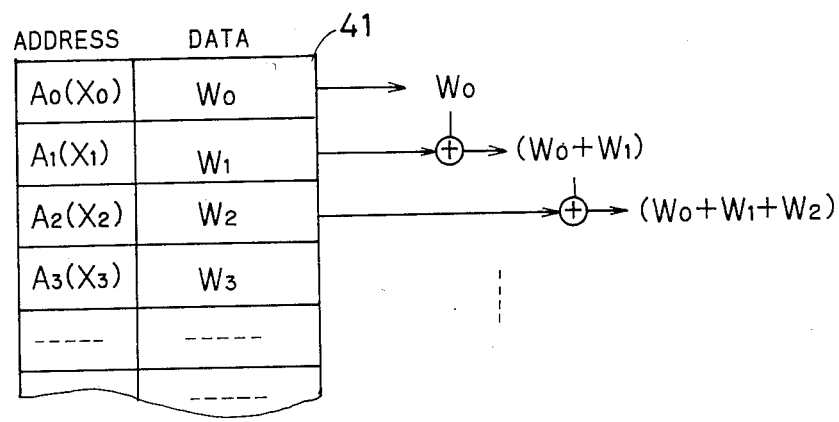

Data $W_0$ in the first address $A_0$ is read from the RAM 41 to be supplied to the adder 44. On the other hand, the latch circuit 45 is cleared to "0" by a reset signal $\overline{RST}$ previously to this processing. Therefore, the adder 44 outputs the data $W_0$. This data $W_0$ is transmitted to the microcomputer 30 through a three-state buffer TB and the I/O port 33, while being latched by the latch circuit 45. Thus, when the RAM 41 outputs subsequent data $W_1$, the adder 44 performs addition of ($W_0+W_1$). The data ($W_0+W_1$) is also outputted to the microcomputer 30, while being latched by the latch circuit 45. Such an operation is repeated so that the microcomputer 30 is sucessively supplied with data $W_0$, ($W_0+W_1$), ($W_0+W_1+W_2$), . . . as shown in FIG. 5B.

It is obvious that the data $W_0$, ($W_0+W_1$), ($W_0+W_1+W_2$), . . . are accumlated values obtained by sequentially accumulating $W_0$, $W_1$, $W_2$, . . . Therefore, assuming that symbol Y represents the rate of accumulated occurrences of pixels with respect to each density level X, an accumulated density histogram h(X) shown in FIG. 6(b) can be obtained. In FIG. 6 and other figures as hereinafter described, $X_{min}$ and $X_{max}$ are defined as follows:

$X_{min}$: density level at which the accumulated density histogram h(X) is changed from 0% for the first time; and $X_{max}$: density level at which the accumulated density histogram h(X) reaches 100%.

Referring again to the flow chart of FIG. 2, the standard gradation correction curve f(X) shown in FIG. 7(b) is modified to obtain a first gradation correction curve F(X) at a subsequent step S3, so that the density of the image is converted to a halftone area rate belonging to a desired halftone area rate range.

For explaining this operation in detail, attention is drawn to the already obtained accumulated density histogram h(X) of FIG. 7(a). FIG. 7(a) is drawn by simplifying the aforementioned FIG. 6(b), and $Y_{min}$ and $Y_{max}$ correspond to 0% and 100% respectively, for example. In FIG. 7(a), two values $Y_S$ and $Y_H$ of the rate of accumulated occurrences are designated. The values of rates $Y_S$ and $Y_H$ of accumulated occurrences are arbitrarily determined to specify density levels to be converted respectively into upper and lower limits $Q_U$ and $Q_L$ of a desired halftone area rate range employed in halftone recording of the image. These values $Y_S$ and $Y_H$ are designated at 99% and 1% for example, to limit the gradation correction curve in a part of several % in the end sides, the highlight side for example, in normal letterpress printing.

When the values $Y_S$ and $Y_H$ are designated, the microcomputer 30 converts the values $Y_S$ and $Y_H$ through the accumulated density histogram h(X) used as a conversion curve to obtain density values $X_S$ and $X_H$ respectively corresponding to the values $Y_S$ and $Y_H$. Since the values $Y_S$ and $Y_H$ respectively correspond to the upper and lower limits $Q_U$ and $Q_L$ of the halftone area rate, the values $X_S$ and $X_H$ respectively correspond to the density levels of the shadow and highlight points. In other words, the density levels $X_S$ and $X_H$ of the shadow and highlight points corresponding to the upper and lower limits $Q_U$ and $Q_L$ of the halftone area rate are specified from the accumulated density histogram h(X) in this process. Thus, there is no need to externally designate the desity levels $X_S$ and $X'_H$ of the shadow and highlight points in this method.

Then, the standard gradation correction curve f(X) shown in FIG. 7(b) is modified so as to convert the density levels $X_S$ and $X_H$ thus specified into the upper and lower limits $Q_U$ and $Q_L$ (FIG. 7(c)) of the employed halftone area rate. In other words, the standard gradation correction curve f(X) is modified so as to pass through a first group of coordinate points:

$$P_{1H}=(X_H, Q_L), P_{1S}=(X_S, Q_U)$$

which are determined in response to the upper and lower limits $Q_U$ and $Q_L$ of a desired gradation correction range of gradation correction in a coordinate plane formed by X and Q.

This modification is performed by linearly transforming the curve f(X) to obtain a first standard gradation conversion curve F(X) by the expression: where $c_1$ and $c_2$ represent constants.

$$F(X) = c_1 f(X) + c_2 \quad (1)$$

The constants $c_1$ and $c_2$ can be obtained through such a condition that the first gradation correction curve F(X) passes through the two points $P_{1H}$ and $P_{1S}$. Namely, the coordinate values of the said two points $P_{1H}$ and $P_{1S}$ are respectively substituted in the expression (1), to obtain the following expressions (2) and (3):

$$F(X_S) = c_1 f(X_S) + c_2 = Q_U \quad (2)$$

$$F(X_H) = c_1 f(X_H) + c_2 = Q_L \quad (3)$$

The expressions (2) and (3) are solved with respect to $c_1$ and $c_2$, to have the following expressions (4) and (5):

$$c_1 = (Q_U - Q_L)/(f(X_S) - f(X_H)) \quad (4)$$

$$c_2 = (Q_L f(X_S) - Q_U f(X_H))/(f(X_S) - f(X_H)) \quad (5)$$

The values $Q_U$ and $Q_L$ are arbitrarily designated by the operator and the values $f(X_S)$ and $f(X_H)$ are obtained from the shape of the standard gradation correction curve f(X). Therefore, the first standard gradation correction curve F(X) is uniquely determined by the expression (1). However, when the aforementioned limit transformation is desired in a density range of $X < X_H$ and $X > X_S$, the first gradation correction curve F(X) is finally provided in the following functional form:

When $X > X_H$, then $F(X) = Q_L$
When $X_H \leq X \leq X_S$, then $F(X) = c_1 f(X) + c_2$
When $X > X_S$, then $F(X) = Q_U$ FIG. 7(c) illustrates the functional form of the first gradation correction curve F(X) thus obtained.

Thus, the first gradation correction curve F(X) for correcting a density level X into a halftone area rate within a desired halftone area rate range $Q_L < Q < Q_U$ is now obtained from the previously given standard gradation correction curve f(X) through the aforementioned process.

At a subsequent step S4 of FIG. 2, a second gradation correction curve H(X) is obtained on the basis of the accumulated density histogram h(X) of FIG. 7(a). First, the accumulated density histogram h(X) is regarded as a gradation correction curve, to modify the accumulated density histogram curve to pass through a second group of coordinate points:

$$P_{2a} = (X_{min}, Q_L)$$

$$P_{2b} = (X_{max}, Q_U)$$

which are determined in response to the upper and lower limits $Q_U$ and $Q_L$. However, the respective density values $X_S$ and $X_H$ of the shadow and highlight points are not employed for specifying the second group of coordinate points, in contrastly to the case of modifying the standard gradation correction curve f(X), since a certain degree of gradation change is to be incorporated also with respect to a density level X within a range of:

$$X_{min} \leq X < X_h$$

$$X_S < X \leq X_{max}$$

Therefore, as obvious from FIG. 9 as hereinafter described, gradation correction by the second gradation correction curve H(X) obtained at the step S4 does not undergo a limit transformation within density regions of $X < X_H$ and $X > X_S$. However, it is not inhibited to identify the first and second groups of coordinate points with each other.

In modifying the accumulated density histogram h(X) to pass through the two points $P_{2a}$ and $P_{2H}$, linear transformaiton is employed similarly to the case of modifying the standard gradation correction curve f(X). Namely, consider the following transformation:

$$H(X) = e_1 h(X) + e_2 \quad (6)$$

assuming that $e_1$ and $e_2$ represent constants. When such a condition that the curve H(X) passes through the two points $P_{2a}$ and $P_{2b}$, the following expressions (7) and (8) are obtained:

$$H(X_{min}) = e_1 h(X_{min}) + e_2 = Q_L \quad (7)$$

$$H(X_{max}) = e_1 h(X_{max}) + e_2 = Q_U \quad (8)$$

Therefore, the constants $e_1$ and $e_2$ are obtained as follows:

$$e_1 = (Q_L - Q_U)/(h(X_{min}) - h(X_{max})) \quad (9)$$

$$e_2 = (Q_L h(X_{max}) - Q_U h(X_{min}))/(h(X_{max}) - h(X_{min})) \quad (10)$$

FIG. 7(d) illustrates the second gradation correction curve H(X) thus obtained.

When the first and second gradation correction curves F(X) and H(X) are obtained in the aforementioned manner, the microcomputer 30 performs arithmetic to compose the first and second gradation correction curves (step S5). While various methods may be employed for such composition, a constant k ($0 \leq k \leq 1$) designated arbitrarily by the operator is employed in this embodiment to obtain a linear combination of the first and second gradation correction curves F(X) and H(X).

Therefore, a third gradation correction curve G(X) obtained by such composition can be expressed as follows:

$$G(X) = F(X) + k(H(X) - F(X)) = (1-k) F(X) + kH(X) \quad (11)$$

Figure 8:
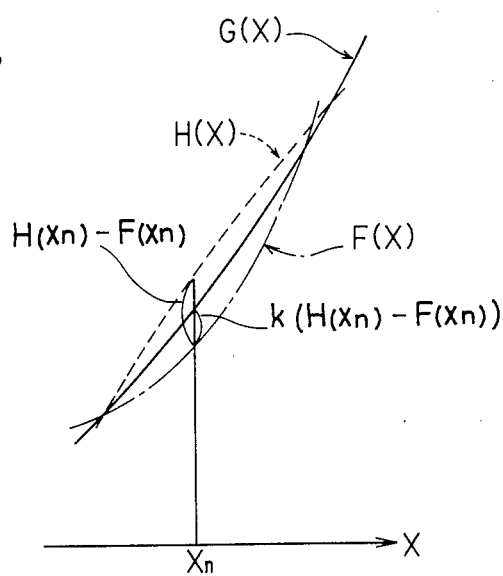
FIG. 8 is a diagram showing the composition of gradation correction curves.

FIG. 8 schmatically shows this composition process, and it is obvious that G(X) can be obtained by multiplying the difference $(H(X_n) - F(X_n))$ between $H(X_n)$ and $F(X_n)$ by k with respect to an arbitrary density level $X_n$ to add the product to F(X).

The constant k herein employed corresponds to the composite ratio, which is set about k=0.1, for example. Thus, the third gradation correction curve G(X) includes the first and second gradation correction curves F(X) and H(X) in the ratio of 9:1. Namely, according to this embodiment, the third gradation correction curve G(X) is generated on the basis of the first gradation correction curve F(X) with addition of the second gradation correction curve H(X) to some extent. Therefore, the first gradation correction curve F(X) can be called a "reference gradation correction curve" and the second gradation correction curve H(X) can be called a "modulating gradation correction curve".

Figure 9:
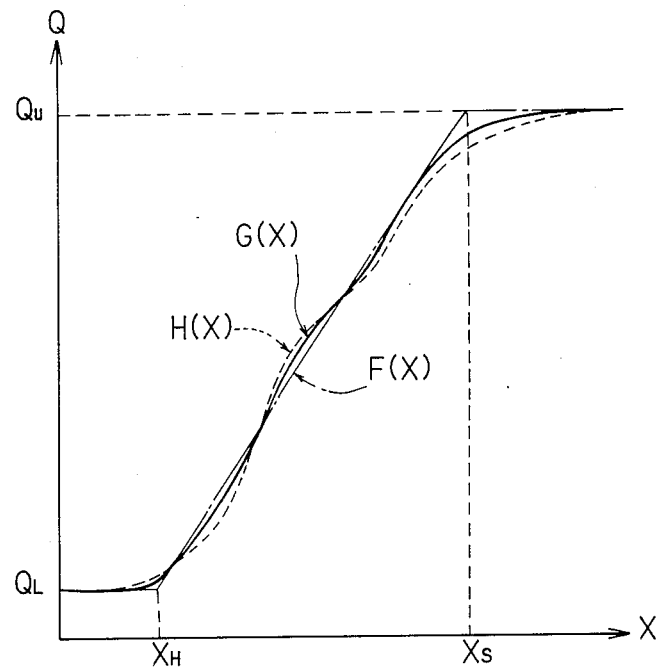
FIG. 9 a diagram showing an example of a gradation correction curve obtained by the composition.

FIG. 9 shows an example of the third gradation correction curve G(X) thus obtained. Further, the aforementioned composition process is expressed by two double arrows directed from FIGS. 7(c) and 7(d)

toward FIG. 7(e). The composite gradation correction curve G(X) has the following characteristics.

First, the gradation correction curve G(X) incorporates the property of gradation correction generally recognized as proper by including the first gradation correction curve F(X) obtained from the standard gradation correction curve f(X) common to respective originals. Further, this curve G(X) reflects chracteristics specific to individual originals by including the second gradation correction curve H(X) obtained from the accumulated density histogram h(X) of the original. In addition, a large number of standard gradation correction curve and complicated arithmetic process are not necessarily required to obtain the third gradation correction curve G(X). Therefore, memory capacity and processing time can be saved.

At a final step S6 of FIG. 2, a gradation correction table is generated in response to the third gradation correction curve G(X). Such processing is performed by writing the relation between the density X and the halftone area rate Q indicated by the third gradation conversion curve G(X) in the RAM 18a of the gradation correction circuit 18 in a look-up table form.

Since the output $V_N$ of the shading correction circuit 16 is supplied as the address input for the RAM 18a in the gradation correction circuit 18, the gradation correction table is formed with an address of the output $V_N$.

After the gradation correction table responsive to the third gradation correction curve G(X) is thus stored in the RAM 18a, the switching circuit 16 is connected to the gradation correction ciurcuit 18. The original 3 is again read/scanned so that the read image data are supplied to the gradation correction circuit 18. The image data are subjected to gradation correction in the gradation correction circuit 18 in response to the third gradation correction curve G(X) to provide a gradation corrected image signal $V_1$, so that recording operation is performed on the basis of an image signal $V_1$.

As hereinabove described, the third gradation correction curve G(X) reflects the characteristics of the original while including correction characteristics of a general standard gradation correction curve, whereby a recorded image obtained through the recording operation has high gradation expressibility.

Figure 10:
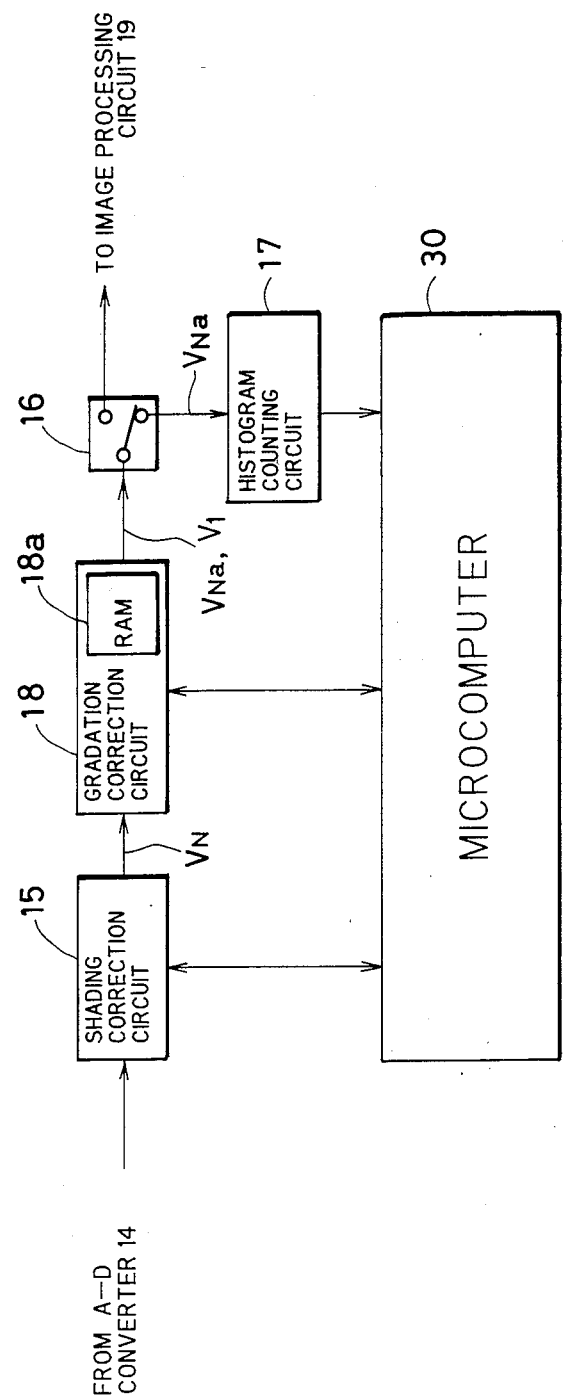
FIG. 10 is a block diagram showing a modification of the embodiment.

The present invention can be modified as follows: First, the relation of connection between the histogram counting circuit 17 and the gradation correction circuit 18 may be changed as shown in FIG. 10, to obtain an accumulated density histogram on the basis of the output from the gradation correction circuit 18. In this case, an arbitrary density correction table is stored in the RAM 18a to obtain a density histogram with respect to data $V_{Na}$ density-converted by the same. However, after the third gradation correction curve G(X) is obtained, the table in the RAM 18a is reloaded to a gradation correction table responsive to the third gradation correction curve G(X).

The various gradation correction curves f(X), h(X), . . . in the aforementioned embodiment may be expressed by numerical expressions or a table of numerical data.

Although only a single type of standard gradation correction curve f(X) is prepared in the aforementioned embodiment, different standard gradation correction curves may be preferably employed depending on the type of the photosensitive material 28 or the like. In this case, a plurality of types of standard gradation correction curves may be prepared to select one of the same.

Also in this case, it is not necessary to store a large number of standard gradation correction curves in the memory in contrast to the conventional case, whereby the required memory capacity can be reduced.

The second gradation correction curve may not be created by employing the accumulated density histogram itself. For example, another histogram curve r(X) defined by:

$$r(X) = \sqrt{h(X)} / \sum_{X=X_{min}}^{X_{max}} h(X) \quad (12)$$

may be employed to modify the same in a similar manner to the aforementioned embodiment, thereby to obtain a second gradation correction curve R(X). When the histogram curve or density destribution curve r(X) is employed, the correction rate of the gradation correction curve to the change in density X is decreased since the square root of the standard gradation correction curve h(X) is obtained. Thus, a relatively smooth gradation correction curve can be obtained.

Further, it is also possible to obtain the differential value of a gradation correction curve from the density historgram of an original to determine a second gradation correction curve on the basis thereof. Thus, a second gradation correction curve may be obtained on the basis of several types of density distribution curves or statistical data statistically expressing the density distribution an original, according to the present invention.

In the aforementioned embodiment, modification is applied to both of the standard gradation correction curve and the accumulated density histogram to pass through groups of coordinate points responsive to the upper and lower limits $Q_H$ and $Q_L$ of the desired halftone area rate range on the gradation correction coordinate plane. However, it is also possible to modify the curves to pass through other coordinate points arbitrarily designated. Further, the aforementioned modification is not necessarily required if the values $Q_U$ and $Q_L$ are fixed, but a standard gradation correction curve passing through these points may be prepared in advance. Namely, the feature of the present invention resides in composition of two types of gradation correction curves, and hence all of methods applied with various modifications are included within the scope of the present invention. The method of composing the gradation correction curves is not restricted to a linear combination. For example, the composition coefficient k in the expression (11) may be selected to be equal to J(X) on the basis of the function J(X) of the density X. Namely, composition coefficients are made different from each other in highlight, middle and shadow parts.

In addition, although reading is performed twice through prescanning and subsequent scanning in the aforementioned embodiment, the reading/scanning may be performed only once. As shown in FIG. 11, for example, switching circuits 47, 48, 49 and a memory device 50, such as a hard disk, may be provided between the shading correction circuit 15 and the switching circuit 16 of FIG. 1A. In this case, the switches 47 and 48 are closed and the switch 49 is opened to perform the operation of the step S2 of FIG. 2. Thus, the accumulated density histogram of a region to be read can be obtained while a pixel density read signal level $V_N$ after shading correction is simultaneously inputted in the memory device 50. In place of again reading/scanning the original 3, the switches 47 and 48 are opened and the switch 49 is closed to make the memory device 50 output the pixel density read signal level $V_N$ stored therein. Then the switching circuit 16 is connected to the gradation conversion circuit 18 so that the pixel density read signal level $V_N$ is supplied to the gradation correction circuit 18. This signal level $V_N$ is subjected to gradation correction in response to a third gradation correction curve G(X), to provide a gradation corrected image signal $V_1$. Recording operation can be performed on the basis of the image signal $V_1$ after gradation correction.

The present invention is not restricted to the flat type scanner as in the aforementioned embodiment, but is applicable in a wide range to a drum type scanner, a facsimile, a copying machine and an image transitting apparatus.

According to the present invention, gradation correction is performed by incorporating both of characteristics of a general standard gradation correction curve and a density distribution reflecting characteristics per original. Thus, appropriate gradation correction can be performed in response to the characteristics for each original on the basis of general gradation correction characteristics. Further, since there is no need to prepare a large number of standard gradation correction curves, operation such a visual comparison is unnecessary to reduce the burden of the operator. In addition, no complicated processing is required to create the gradation correction curves, while only a single or a few types of standard gradation correction curves may be prepared. Thus, the processing time for creating the gradation correction curves may be reduced while the required memory capacity may be small.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for correcting the gradation of an image comprising the steps of:
   preparing a standard gradation correction curve expressing an arbitrarily defined gradation correction rule;
   receiving image data obtained by reading an image of an original with a photoelectric scanning mechanism;
   statistically obtaining a density distribution curve of said image on the basis of said image data;
   obtaining a first gradation correction curve on the basis of a said standard gradation correction curve;
   obtaining a second gradation correction curve on the basis of said density distribution curve of said image;
   obtaining a third gradation correction curve by composing said first and second gradation correction curves at an arbitrary ratio; and
   correcting said gradation of said image through said third gradation correction curve to obtain a gradation corrected image.

2. A method in accordance with claim 1, wherein said first gradation correction curve is obtained by modifying said standard gradation correction curve to pass through a first group of coordinate points provided arbitrarily on a gradation correction coordinate plane.

3. A method in accordance with claim 2, wherein said second gradation correction curve is obtained by modifying said density distribution curve to pass through a second group of coordinate points provided arbitrarily on said gradation correction coordinate plane.

4. A method in accordance with claim 3, wherein said density distribution curve is an accumulated density histogram curve of said image.

5. A method in accordance with claim 4, wherein said first group of coordinate points are determined on the basis of arbitrarily designated upper and lower limits of the density range of said gradation corrected image and highlight and shadow points density levels of said image to be respectively corrected to said upper and lower limits through said first gradation correction curve, said highlight and shadow points density levels being determined by converting arbitrarily densignated values through said accumulated density histogram curve used as a conversion curve.

6. An apparatus for correcting the gradation of an image represented by image data, said apparatus comprising:
   memory means for storing a previously prepared standard gradation correction curve;
   counting means for counting the frequency of occurrences of density levels in said image data thereby to obtain statistical data statistically expressing a density distribution of said image;
   first gradation correction curve generating means for generating a first gradation correction curve on the basis of said standard gradation correction curve;
   second gradation correction curve generating means for generating a second gradation correction curve on the basis of said statistic data;
   composing means for composing said first and second gradation correction curves at an arbitrary ratio to give a third gradation correction curve; and
   gradation correction means for correcting the gradation of said image on the basis of said third gradation correction curve to generate a gradation corrected image.

7. An apparatus in accordance with claim 6, wherein said first gradation correction curve generating means includes:
   means for modifying said standard gradation correction curve to pass through a first group of coordinate points provided arbitrarily on a gradation correction coordinate plane thereby to obtain said first gradation correction curve.

8. An apparatus in accordance with claim 7, wherein said statistical data are expressed in the form of an accumulated density histogram curve,
   said second gradation correction curve generating means including means for modifying said accumulated density histogram curve to pass through a second group of coordinate points provided arbitrarily on said gradation correction plane thereby to obtain said second gradation correction curve.

9. An apparatus in accordance with claim 8, wherein said counting means includes:
   means for counting the frequency of occurrences of density levels in said image data for each density region having a prescribed density width to obtain a density histogram of said image, and
   means for accumulating said density histogram to obtain said accumulated density historgram curve.

10. An apparatus in accordance with claim 9, wherein said first group of coordinate points are determined on the basis of arbitrarily designated upper and lower limits of the density range of said gradation corrected image and highlight and shadow points density levels to be respectively corrected to said upper and lower limits through said first gradation correction curve, said highlight and shadow points density levels being determined by converting arbitrarily designated values through said accumlated density histogram curve used as a conversion curve.

* * * * *